(12) United States Patent
Foerster et al.

(10) Patent No.: US 10,099,376 B2
(45) Date of Patent: Oct. 16, 2018

(54) METHOD FOR SETTING UP AND/OR CALIBRATING A ROBOT

(71) Applicant: Ecoclean GmbH, Filderstadt (DE)

(72) Inventors: Michael Foerster, Eupen (BE); Benno Zimmermann, Dueren (DE); Ruediger Fritzen, Roetgen (DE)

(73) Assignee: Ecoclean GmbH, Filderstadt (DE)

( * ) Notice: Subject to any disclaimer, the term of this patent is extended or adjusted under 35 U.S.C. 154(b) by 41 days.

(21) Appl. No.: 15/056,819

(22) Filed: Feb. 29, 2016

(65) Prior Publication Data

US 2016/0176054 A1 Jun. 23, 2016

Related U.S. Application Data

(63) Continuation of application No. PCT/EP2014/002331, filed on Aug. 26, 2014.

(30) Foreign Application Priority Data

Aug. 30, 2013 (DE) .................. 10 2013 014 467

(51) Int. Cl.
*G06F 19/00* (2018.01)
*B25J 9/16* (2006.01)
*B25J 19/02* (2006.01)

(52) U.S. Cl.
CPC .......... *B25J 9/1692* (2013.01); *B25J 19/021* (2013.01)

(58) Field of Classification Search
CPC .................................................. B25J 19/021
See application file for complete search history.

(56) References Cited

U.S. PATENT DOCUMENTS 6,445,964 B1   9/2002   White et al.
6,822,412 B1   11/2004  Gan et al.
(Continued)

FOREIGN PATENT DOCUMENTS

DE       19960933 C1    1/2001
DE     112008003963 T5  6/2011
(Continued)

OTHER PUBLICATIONS

English translation of the Office action and search report of the Chinese Patent Office dated Jan. 26, 2017 in corresponding Chinese patent application 201480047487.
(Continued)

*Primary Examiner* — Mingjen Jen
*Assistant Examiner* — Ian Jen
(74) *Attorney, Agent, or Firm* — Walter Ottesen, P.A.

(57) ABSTRACT

A method for setting up and/or calibrating a robot positioned in a work environment at an operation site, wherein a predetermined routine is carried out for the purposes of setting up and/or calibration. The method includes the steps of generating the routine for the robot at a simulation site distant from the operation site; after completing the generation of the routine, transmitting the routine to a control unit of the robot at the operation site; calling up the routine and remotely executing the routine at the operation site via a control center located remotely from the operation site; and, after the start of the generated routine, allowing the generated routine to automatically process without intervention by an operator at the operation site.

17 Claims, 2 Drawing Sheets

(56) References Cited

U.S. PATENT DOCUMENTS

| | | | |
|---|---|---|---|
| 7,945,349 B2 | 5/2011 | Svensson et al. | |
| 7,979,159 B2 | 7/2011 | Fixell | |
| 2005/0166413 A1* | 8/2005 | Crampton | B25J 13/088 33/503 |
| 2009/0110608 A1* | 4/2009 | Vierheilig | B01J 8/0015 422/110 |
| 2010/0262288 A1 | 10/2010 | Svensson et al. | |
| 2013/0147944 A1 | 6/2013 | Zhang et al. | |
| 2013/0158708 A1 | 6/2013 | Emmertz et al. | |

FOREIGN PATENT DOCUMENTS

| | | |
|---|---|---|
| EP | 1 120 204 A2 | 8/2001 |
| EP | 1 152 212 A2 | 11/2001 |
| JP | 2007-260834 A | 10/2001 |
| WO | 2009/149740 A1 | 12/2009 |

OTHER PUBLICATIONS

Liu, Y. et al, "Development and Sensitivity Analysis of a Portable Calibration System for Joint Offset of Industrial Robot", The 2009 IEEE/RSJ International Conference on Intelligent Robots and Systems, Oct. 11-15, 2009, St. Louis, US, pp. 3838 to 3843.
International Search Report dated Nov. 4, 2014 of international application PCT/EP2014/002331 on which this application is based.

* cited by examiner

METHOD FOR SETTING UP AND/OR CALIBRATING A ROBOT

CROSS REFERENCE TO RELATED APPLICATIONS

This application is a continuation application of international patent application PCT/EP2014/002331, filed Aug. 26, 2014, designating the United States and claiming priority from German application 10 2013 014 467.1, filed Aug. 30, 2013, and the entire content of both applications is incorporated herein by reference.

FIELD OF THE INVENTION

The invention relates to a method for setting up and/or calibrating a robot with a predetermined routine.

BACKGROUND OF THE INVENTION

The work movements to be carried out by a robot in a robot cell are usually programmed and simulated offline by means of CAD tools. Within the scope of programming, the real robot cell cannot be represented exactly due to the manufacturing and assembly deviations thereof. In order to compensate for these deviations and inaccuracies, setup routines for the robot need to be programmed. Here, the gripper system situated at the robot arm must be commissioned manually by a specialist. By means of the setup routines, specific reference points within the washing cell are approached and corrected with the aid of reference tips. In the case of a crash, these setup routines must be carried out from scratch by the specialist.

Therefore, an industrial robot positioned in a robot cell needs to be commissioned and/or calibrated after the assembly at the site of operation in order to match the coordinates of the robot base with the coordinates of the robot cell. Precise work is only possible if the robot is commissioned exactly in the robot cell.

Manual movement of the robot for aligning two tips in relation to one another for the purposes of the calibration is complicated. In particular, operating service routines for establishing the coordinate systems requires advanced robot knowledge and experience from the user. This relates, firstly, to general knowledge about the function and setup of user coordinate systems, and, secondly, special knowledge about the respective used robot control from various manufacturers.

EP 1 120 204 A2 has disclosed a method for setting up an industrial robot in a robot cell. Here, the coordinates of the robot base in a coordinate system are assumed to be a given reference system; then, for the purposes of setting up the robot in the robot cell, various measurement points within the robot cell are approached in situ with a measurement tip arranged at the end of the robot arm by way of manual control and the coordinates of the measurement points are detected. Since the coordinates of the approached measurement points within the robot cell are known, there can be, together with the detected coordinates, a conversion of the coordinates to the reference system. The position of the measurement tip, and hence of the end of the robot arm, in the space of the robot cell can thus be converted to the reference coordinate system; the industrial robot is set up.

For manual setup, calibration and first startup of a robot, skilled staff, who carry out the respective routines and operating steps for setup and/or calibration and for the first startup of the robot manually by way of a control panel, are regularly required in situ.

Since, as a matter of principle, a new setup and calibration must take place prior to a startup after a first installation of the robot, after a repair on the robot or after repositioning the robot in the robot cell, there are great pressures on the service staff. Moreover, since the sites of operation are usually scattered over the whole planet, the commissioning of a robot at the site of operation is costly in terms of time, staff and expenditure.

SUMMARY OF THE INVENTION

It is an object of the invention to provide a method for setting up and/or calibrating a robot at the site of operation which can be carried out quickly in a simple manner and at reasonable cost with respect to trained personnel.

The method of the invention is for at least one of setting up and calibrating a robot positioned in a work environment at an operation site, wherein a predetermined routine is processed for at least one of the purposes of setting up and calibration. The method includes the steps of: generating the routine for the robot at a simulation site distant from the site of operation; after completing the generation of the routine, transmitting the routine to a control unit of the robot at the operation site; calling up the routine at the operation site and remotely executing the routine at the operation site via a control center located remotely from the operation site; and, after the start of the generated routine, allowing the generated routine to automatically process without intervention by an operator at the operation site.

For the purposes of setting up and/or calibrating the robot at the site of operation, a routine is initially programmed by specialist staff at a simulation location distant from the site of operation. In the process, there is a virtual representation of both the robot itself and, expediently, the complete work environment thereof, such as, for example, the work cell in which the robot operates. After completing the generation of the complete routine at the simulation location, the latter is transmitted to a control unit of the robot at the site of operation and then called and executed at the site of operation.

The programmed routine is configured in such a way that the setup and calibration of the robot in a robot cell can be carried out without specialist staff in situ. As a result, this dispenses with the trip of the specialist staff to the site of operation; even less qualified employees at the site of operation are put into the position of carrying out the setup and calibration, and the first startup, of a robot by way of the method according to the invention. In particular, relatively long downtimes in production processes after crashes in the robot cell can be avoided since no robotics specialist is required for recommissioning. Moreover, inaccuracies in setup routines by hand-eye calibration can be avoided.

Setting up and/or calibrating the robot with the generated routine can initially be carried out virtually at the simulation location in order to identify errors, bugs or the like. This ensures that the routine operates properly. In the process, the whole work environment with all elements necessary for setup and/or calibration are represented virtually and the setup or calibration is worked through completely in a virtual manner. The finished routine is only transmitted to the control unit of the robot at the site of operation in order to be executed there after successful completion of the virtual setup of a virtual robot at the simulation location.

The generation or programming of the routine at the simulation location is expediently performed without a data connection to the robot at the site of operation, that is, offline.

The completed and tested routine is to be executed by remote control from a control center distant from the site of operation, wherein the control center may be identical to the simulation location. In this case, the control center communicates with the site of operation by way of a wireless and/or wired connection, for example, by way of a radio connection, a physical data line, an internal or external network such as, for example, intranet or Internet, a telephone line, WLAN, Bluetooth, mobile communications or else infrared connection. For the purposes of monitoring the movements of the robot during the setup and/or calibration at the site of operation, an image transmission from the site of operation to the control center may be advantageous. As a result, a remote controller in the control center is able to identify at all times whether given commands are also executed by the robot at the site of operation. As a result, incorrect controls can be identified optically and the robot can be shut down where necessary.

Expediently, there is an online data connection between the control center and the simulation location during the setup and/or calibration of the robot by remote control. Hence, the control center can intervene largely directly in the routine without time delay, which is caused by an otherwise required connection setup, if intervention by the remote controller is necessary. An existing data connection is expediently operated as a VPN (virtual private network) tunnel in order to ensure confidentiality of the data transmitted via the data line.

According to the invention, provision is made for setup movements of a robot tool tip to be carried out relative to a position sensor within the programmed routine, which position sensor is arranged in a stationary manner with given, known coordinates relative to the robot base in the workspace of the robot, for example, a robot cell. The position coordinates of the robot tool tip detected by the stationary position sensor and/or the rotation of the robot tool tip are detected and expediently output to a control unit. Expediently, a plurality of positions of the tool tip are detected within the detection region of the position sensor, increasing the accuracy of the data. The detected data, which are preferably transmitted to the control unit, are used to evaluate the position coordinates and/or the rotation within the routine and to convert these into the coordinate system of the robot base at the site of operation, which may form a reference coordinate system at the site of operation. In this way, automatic setup of the robot in the workspace at the site of operation is possible using the routine. After the measurement, the actual position between the robot tool tip and the position sensor is known and so—using the known coordinates of the robot base in the workspace and the known coordinates of the position sensor in the workspace—there can be a conversion to a desired reference coordinate system.

Expediently, the actual position coordinates of the robot tool tip within the position sensor are detected by a subroutine which is worked through as a submenu in the generated routine.

In a further method step, a position sensor securely mounted at the robot tool tip approaches at least one reference point lying in the work region of the robot at predetermined coordinates within the scope of the routine and the position coordinates of the reference point detected by the position sensor and/or the rotation of the reference point are detected. The detected position coordinates and/or the rotation of the reference point relative to the robot base are evaluated within the routine and converted into the coordinate system of the robot base at the site of operation. After measuring a reference point, the actual position between the robot base and the reference point in the workspace is known, and so—using the known coordinates of the robot base in the workspace and the known coordinates of the reference point in the workspace—there can be a conversion to a desired reference coordinate system.

Expediently, the actual position coordinates of the reference point within the workspace are detected by a subroutine which is worked through as a submenu in the generated routine.

Approach of the reference points can also be carried out manually by a user at the site of operation; however, in an embodiment of the invention, provision is made for approaching at least one reference point via remote control by specialist staff at the control center. Preferably, after the start thereof at the site of operation, the routine generated at the simulation location is run through automatically at the site of operation without intervention by a user. Intervention by a user at the site of operation is not necessary. Expediently, the position sensor represented virtually at the simulation location corresponds to the position sensor used as hardware at the site of operation.

It should be highlighted that, after completion of the setup/calibration routine, the robot can also be put into operation by remote control from a spatially distant control center or a control center at a different location, and so the staff in situ need not have any particular specialist knowledge in relation to the setup and/or calibration routine.

In order to carry out the method for setting up and/or calibrating a robot in a work environment at a site of operation, provision is made for a device which consists of a robot arranged in a robot cell and a calibration system for setting up the robot. The calibration system is connected to a transmission and reception unit. A wireless data connection to a base unit provided outside of the robot cell is set up by way of the transmission and reception unit within the robot cell. The calibration system within the robot cell communicates wirelessly with the base unit outside of the robot cell.

The wireless connection of the calibration system to an external control unit of the robot is advantageous for all applications in which the robot is situated within testing environmental conditions, for example, within a wet cell in a cleaning installation, in which electrical protection classes IP 65, 67 or higher are to be observed. The wireless communication for setting up the robot is also advantageously applicable in the food industry, in foundry environments, in the pharmaceutical industry and the like.

If the calibration system needs to be removed for the production operation, for example because it represents a constraining contour that is too large, a calibration system with a transmission and reception unit is advantageous. On the one hand, the calibration system need not be configured for a permanent stay in the robot cell, for example, a wet cell; on the other hand, otherwise necessary dismantling of the calibration system, including cabling, open plugs at the robot, et cetera, is avoided.

The calibration system is expediently fixed to the robot arm, more particularly assembled at the tool tip of the robot arm. Advantageously, the transmission and reception unit is arranged in the housing of the calibration system together with an energy store such as an accumulator for supplying voltage to the components.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
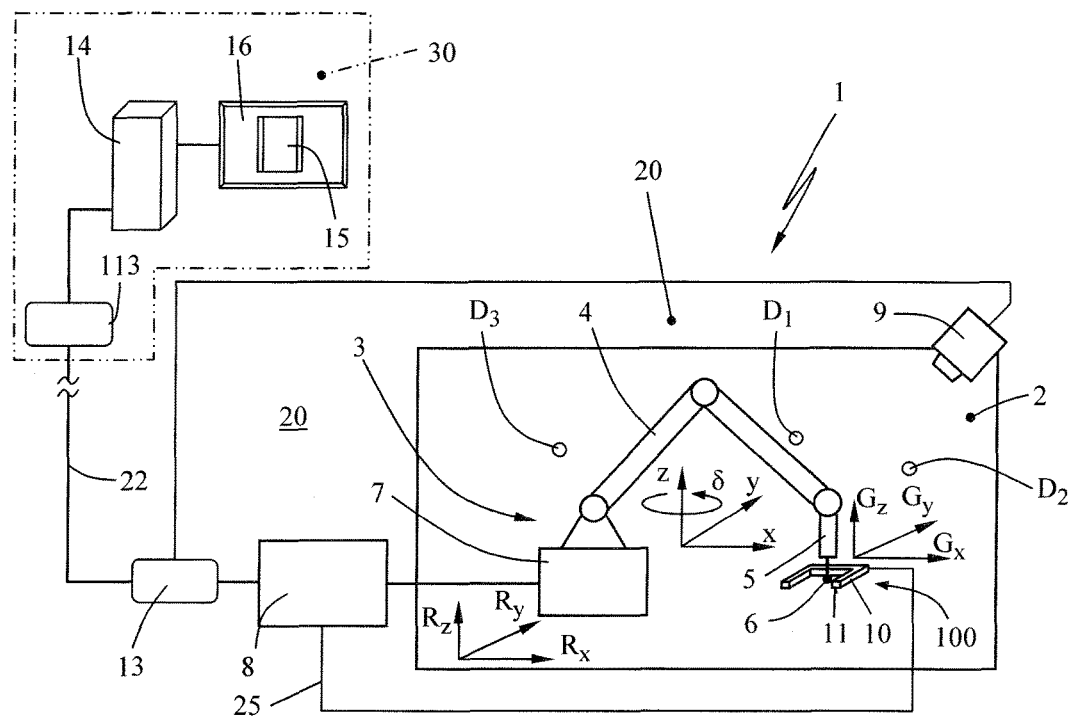
FIG. 1 shows a schematic illustration of a device for setting up and/or calibrating a robot according to the method according to the invention.

The device 1 schematically shown in FIG. 1 substantially consists of a robot cell 2, which can be, for example, a washing cell, cleaning cell, painting cell or the like. Arranged in the robot cell 2 is the robot 3, which includes a robot base 7 and a robot arm 4. The position of the robot base 7 in the workspace of the robot cell 2 is determined by coordinates in the coordinate system ($R_x$, $R_y$, $R_z$). A test mandrel 6 provided for setting up and/or calibrating the robot 3 in the workspace thereof, that is, in the robot cell 2, is assembled at the tool tip 5 of the robot arm 4. The test mandrel 6 can also be held by the gripper system of the robot 3.

The robot base 7 is connected to a control unit 8, in which the control software for the movements of the robot 3 is executed; the control unit 8 provides appropriate control commands to the robot 3 in order to move the robot arm 4 according to predetermined work routines.

In FIG. 1, a calibration system 100 for detecting position coordinates of a test mandrel 6 is furthermore provided in the robot cell 2; the calibration system being a position sensor 10, which may expediently be embodied as a fork sensor 11, in the embodiment. The fork sensor 11 is connected to the control unit 8—preferably by way of a computer unit 12 (FIG. 3). In the embodiment according to FIGS. 1 to 3, the fork sensor 11 is connected by cable by way of a signal cable 25 to the computer unit 12 or the control unit 8. In the device according to FIG. 1, the calibration system 100 or the position sensor 10 is arranged stationary in the workspace of the robot cell 2. The position sensor 10 has the coordinates ($G_x$, $G_y$, $G_z$) in the workspace. By way of the position sensor 10, it is possible to detect, in particular, a location or spatial position, to be approached, of a test mandrel 6 within the robot cell 2 relative to the spatial coordinates of the position sensor 10.

In a further embodiment, the calibration system 100 or the position sensor 10 can be embodied as an optical position sensor. The optical position sensor can expediently detect the position of the test mandrel 6 in the workspace of the robot cell 2 with the aid of an optical image acquisition system or an optical measurement system, for example, based on lasers.

The control unit 8 has a connection to a data line 22, for example to a network such as an intranet or the Internet, by way of a router 13. Furthermore, a camera 9, which detects the internal space of the robot cell 2 and which feeds the latter as image data into the data line 22 by way of the router 13, can be connected by way of the router 13.

A spatially distant data processing installation 14, for example, a personal computer, is connected to the data line 22—either in a wired or wireless manner. The data processing installation 14, for example, at a simulation location 30, is used to generate a routine 15 for the robot 3, by means of which a robot 3 standing at a site of operation 20 can be set up and/or calibrated by remote control. The movements of the robot arm 4 during the execution of the routine 15 at the site of operation 20 can be followed on a screen 16 at the simulation location 30. The spatial separation between site of operation 20 and simulation location 30 or a control center 40 is indicated in FIG. 3 by the dash-dotted line 50.

As shown in FIG. 1 in particular, the robot cell 2 is erected at a site of operation 20, whereas the data processing installation 14 with the routine 15 is provided at a simulation location 30. In FIG. 1, the spatial separation is indicated by the data line 22 drawn with an interruption. The connection between the simulation location 30 and the distant site of operation 20 is brought about by way of a wired and/or wireless connection, expediently by way of the data line 22, which is preferably embodied as a VPN (virtual private network) tunnel.

According to the invention, provision is made for a routine 15, in particular a routine for setting up and/or calibrating the robot 3 at the site of operation 20, to be generated at the simulation location 30. In this case, the robot 3 at the site of operation 20 with the workspace thereof, for example, the robot cell 2, is represented virtually in the data processing installation 14 at the simulation location 30. The virtual representation also comprises the position sensor 10, used at the site of operation as hardware, and at least one reference point ($D_1$, $D_2$, $D_3$) specified in the workspace. Expediently, the robot cell 2 of the site of operation 20 is represented completely in a virtual manner. The routine 15 generated at the simulation location 30 is initially tested virtually on the data processing installation 14 at the simulation location 30 and, preferably, a virtual setup of the robot 3 in a virtual robot cell is also run through. As a result, obvious errors of the programmed routine 15, bugs or the like, can be determined at the simulation location 30 and can be rectified prior to use at the site of operation 20 until the programmed routine 15 is adapted accordingly by a person skilled in the art. After a successful test run of the routine 15 on a virtual control unit for a robot at the simulation location 30, the routine 15 is released for use in practice.

The routine 15 programmed at the simulation location 30 is now transmitted by way of a router 113 and the data line 22 to the spatially distant router 13, which in particular is several hundred kilometers away, at the site of operation 20 and downloaded to the control unit 8 of the robot 3 at the site of operation 20. The routine 15 is loaded into the control unit 8 of the robot 3 at the site of operation 20 and started, preferably started by remote control, preferably by way of a control center 40 (FIG. 3). The routine 15 can also be started manually or automatically at the site of operation 20 after a successful download of the routine 15.

The control center 40 (FIG. 3) can be at any geographical location, which may differ from the site of operation 20 and the simulation location 30. The control center 40 can also be at the simulation location 30, where programming of the routine 15 was carried out.

A subroutine 115 (FIG. 3), which carries out and monitors the setup movements of the robot tool tip 5 with the test mandrel 6 using the fork sensor 11, is expediently called within the routine 15 for setting up and/or calibrating the robot 3. In one embodiment, the fork sensor 11 of the position sensor 10 detects the position coordinates x, y and z of the test mandrel 6 within the fork sensor 11 and forwards the coordinates, which may have been processed by way of the computer unit 12 (FIG. 3), to the control unit 8 of the robot 3. The control unit 8 evaluates these position coordinates x, y, and z within the programmed routine 15 or the subroutine 115; together with the known coordinates ($R_x$, $R_y$, $R_z$) of the robot base 7 in the workspace of the robot cell 2 and the known coordinates ($G_x$, $G_y$, $G_z$) of the position sensor 10 in the workspace, there is a conversion to a desired reference coordinate system at the site of operation 20, for example, to the coordinates of the robot base 7.

When detecting the actual coordinates x, y and z of the robot tool tip 5 by the position sensor 10, it is also possible to determine, detect and forward to the control unit 8 rotations δ of the robot tool tip 5 or of the test mandrel 6 in the workspace of the robot cell 2. Rotations δ of the robot tool tip 5 or of the test mandrel 6 can thus also be taken into account within the scope of the conversion to the desired user coordinate system at the site of operation 20. In this case, it may be expedient for the computer unit 12 of the position sensor 10 to control the setup and calibration movements of the robot arm 4.

In the first method step for setup and/or calibration, the position of the position sensor 10 within the robot cell 2 is stationary and known; by way of the detected position coordinates and/or rotation of the robot tool tip 5 with the test mandrel 6 relative to the position sensor 10, it is possible to determine the spatial position of the robot 3 within the robot cell 2.

In a second method step, the setup and/or calibration is completed by approaching reference points ($D_1$, $D_2$, $D_3$), provided in the workspace or the robot cell 2, by the robot tool tip 5. By way of example, tools or processing devices for a workpiece moved by the robot arm 4 may be provided at the reference points ($D_1$, $D_2$, $D_3$). If the robot cell 2 is a washing cell, for example, washing nozzles or washing lances are arranged in a stationary manner at the reference points ($D_1$, $D_2$, $D_3$) in the robot cell.

Approaching the reference points ($D_1$, $D_2$, $D_3$) within the robot cell 2 can be undertaken manually by an operator at the site of operation 20; however, a trained mechanic would be required therefor. In an embodiment of the invention, the approach of at least one of the reference points ($D_1$, $D_2$, $D_3$) by the robot tool tip 5 is carried out by remote control from the control center 40, which can also be the simulation location 30. At the site of operation 20, a mechanic must merely assemble the position sensor 10 at the tool tip 5 of the robot arm 4—after disassembling the test mandrel 6 from the first method step—and clear the robot 3 for further execution of the programmed routine 15, in particular a further subroutine 115.

Figure 2:
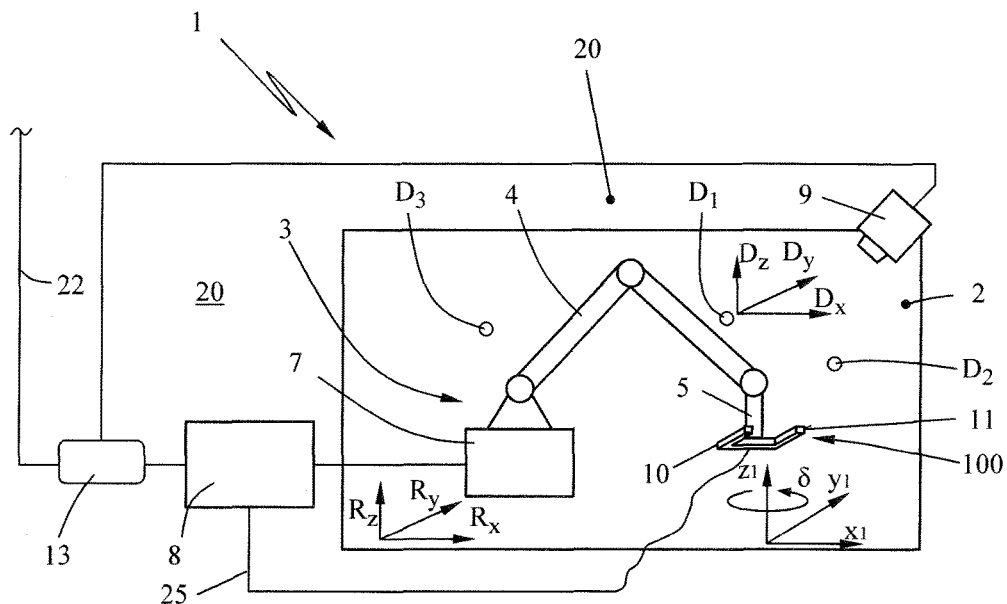
FIG. 2 shows a schematic illustration of a device for setting up and/or calibrating a robot according to FIG. 1, with a moved calibration system.
Figure 3:
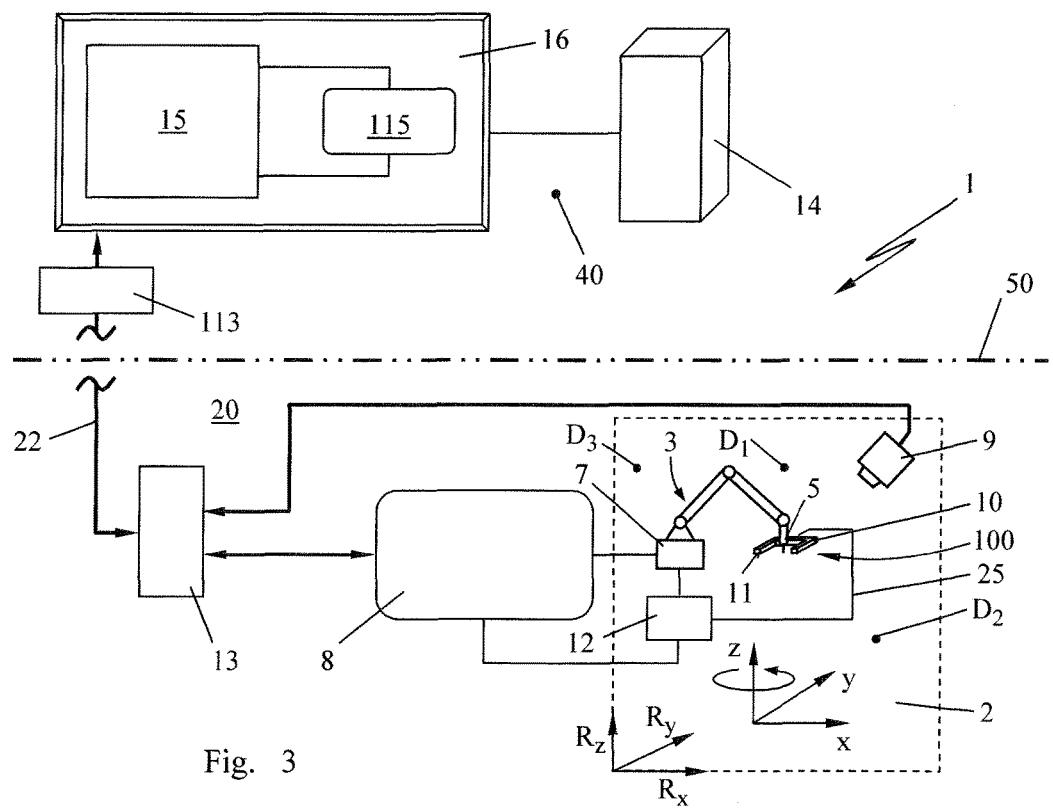
FIG. 3 shows a schematic illustration of a device in accordance with FIG. 1 with a control center; and, FIG. 4 shows a schematic illustration of a device for setting up and/or calibrating a robot according to FIG. 1, with a wireless calibration system assembled at the robot arm.

In accordance with FIG. 2, the position sensor 10 securely assembled to the robot tool tip 5 approaches at least one reference point $D_1$, $D_2$ or $D_3$ lying at predetermined coordinates ($D_x$, $D_y$, $D_z$) within the scope of the routine 15, in particular within the scope of a further subroutine 115 (FIG. 2), in the second method step carried out now and the position coordinates ($x_1$, $y_1$, $z_1$) detected by the position sensor 10 of the approached reference point $D_1$, $D_2$ or $D_3$ and/or the rotation δ of the reference point $D_1$, $D_2$ or $D_3$ is/are detected in space. Within the scope of the routine 15 or the further subroutine 115, the position coordinates ($x_1$, $y_1$, $z_1$) and/or the rotation δ are evaluated and converted into a desired reference coordinate system at the site of operation 20, for example, into the coordinate system ($R_x$, $R_y$, $R_z$) of the robot base 7 at the site of operation 20. After measuring a reference point $D_1$, $D_2$ or $D_3$, the actual position between the robot base 7 and the reference point $D_1$, $D_2$ or $D_3$ in the workspace of the robot 3 is known, and so—using the known coordinates ($R_x$, $R_y$, $R_z$) of the robot base 7 in the workspace of the robot cell and the known coordinates of the reference point ($D_x$, $D_y$, $D_z$) in the workspace—there can be a conversion to a desired reference coordinate system.

The overall system can be configured in such a way that the setup and calibration of the robot 3 at the site of operation 20 is executed automatically without intervention by a user in situ after the download of the routine 15 programmed at the simulation location 30. In situ, a mechanic must merely disassemble the test mandrel 6 from the robot arm 4 or the tool tip 5 thereof and assemble the position sensor 10 at the robot arm 4 or in the tool center point (TCP) at the end of the robot arm 4 for the purposes of carrying out the second method step. The setup and/or calibration of the robot 3 at the site of operation 20 requiring specialist staff is/are preferably carried out by remote control.

Remote control of the routine 15 for setting up the robot 3 from the simulation location 30 can be monitored by an image transmission from the site of operation 20 to the simulation location 30 or to the control center 40; to this end, a camera 9 is provided, the latter detecting the workspace of the robot cell 2 of the robot 3 and transmitting an image from the interior of the robot cell 2 to a remote controller at the control center 40, for example, at the simulation location 30. During the remote control setup and/or calibration of the robot 3 at the site of operation 20, there expediently is a permanent data connection between the site of operation 20 and the control center 40, for example, at the simulation location 30. This data connection is advantageously operated as a VPN (virtual private network) tunnel and it ensures the security of the transmitted data.

Setting up and calibrating the robot 3 with the robot base 7 thereof can be carried out, for example, as follows:

The robot 3 or the robot tool tip 5 with the test mandrel 6 (robot TCP—tool center point) is calibrated relative to the robot base 7; the dimensions of the test mandrel 6 are known.

In the initial situation, the robot base 7, in respect of the work position thereof, is in any position in relation to a superordinate reference coordinate system. The position of the position sensor 10 and the reference points $D_1$, $D_2$ or $D_3$ in space is known in respect of the coordinates in a superordinate reference coordinate system.

The coordinates of the robot base 7 are initially set to zero. From this zero position, different positions within the fork sensor 11 or relative to the position sensor 10 are approached with the tool tip 5 of the robot 3 and the coordinates x, y and z and/or rotations δ of the tool tip 5 are detected and documented.

These coordinates are subjected to a coordinate transformation with the aid of the computer unit 12 or the control unit 8, using the known absolute coordinates, which specify the absolute position of the position sensor 10, embodied as fork sensor 11, in the robot cell 2, wherein the relative coordinates of the robot 3 are converted into absolute coordinates relative to the robot cell 2. As a result of this, the relative position between the current work position of the robot 3 and the superordinate reference coordinate system is determined.

Now, the work position of the robot 3 is corrected into the superordinate coordinate system. What can be achieved thereby is a setup of the robot 3 relative to the robot cell 2 or the processing object, wherein the robot 3 is substantially responsible itself for the setup thereof and for the setup of other objects in the robot cell 2.

In a practical case, a robotics specialist at the simulation location 30 can assist a local robot engineer at the site of operation 20 online. The local robot engineer provides the robotics specialist at the distant simulation location 30 with information. For assistance purposes, a secure Internet connection is established over the VPN tunnel, in particular by way of an industrial mobile communications router between the two subscribers. The robotics specialist can access the camera 9 and the robot 3, as well as the control unit 8 thereof. With the aid of the video connection, the robotics specialist can assist the local robot engineer with the installation of the calibration system 100. After successful installation of the calibration system 100, the robotics specialist, or optionally the local robot engineer, can start the automatically executed setup routine. By way of the video connection from the camera 9, the robotics specialist can monitor the whole process and intervene or control when necessary. This scenario can be carried out very quickly and without much effort during commissioning or else after a crash. Updates of the robot system, for example, in the cleaning installation, can also be realized.

The setup routines for calibrating the robot 3 in the robot cell 2 can be completely automated. Automatic setup routines programmed in the robot controller are provided for all user coordinate systems to be measured. These setup routines are started by the superordinate machine HMI (human machine interface) and transferred by way of a field bus interface of the PLC (programmable logic controller) to the robot controller. Thus, operation is carried out within the scope of the machine HMI, to which a user is introduced during the machine training. Operation of the robot controller itself is no longer required. As a result, the following advantages, inter alia, emerge:

- no laborious, manual movement of the robot "tip to tip";
- repeatable measurement results independent of the user in situ;
- a user no longer needs to be exposed to the ambient conditions within an industrial robot cell 2, for example, a cleaning installation (temperature, solvent vapors, humidity), when setting up the robot;
- no special robot knowledge is required on the part of the user.
- no laborious, manual movement of the robot "tip to tip";
- repeatable measurement results independent of the user in situ;
- a user no longer needs to be exposed to the ambient conditions within an industrial robot cell 2, for example, a cleaning installation (temperature, solvent vapors, humidity), when setting up the robot;
- no special robot knowledge is required on part of the user.

Figure 4:
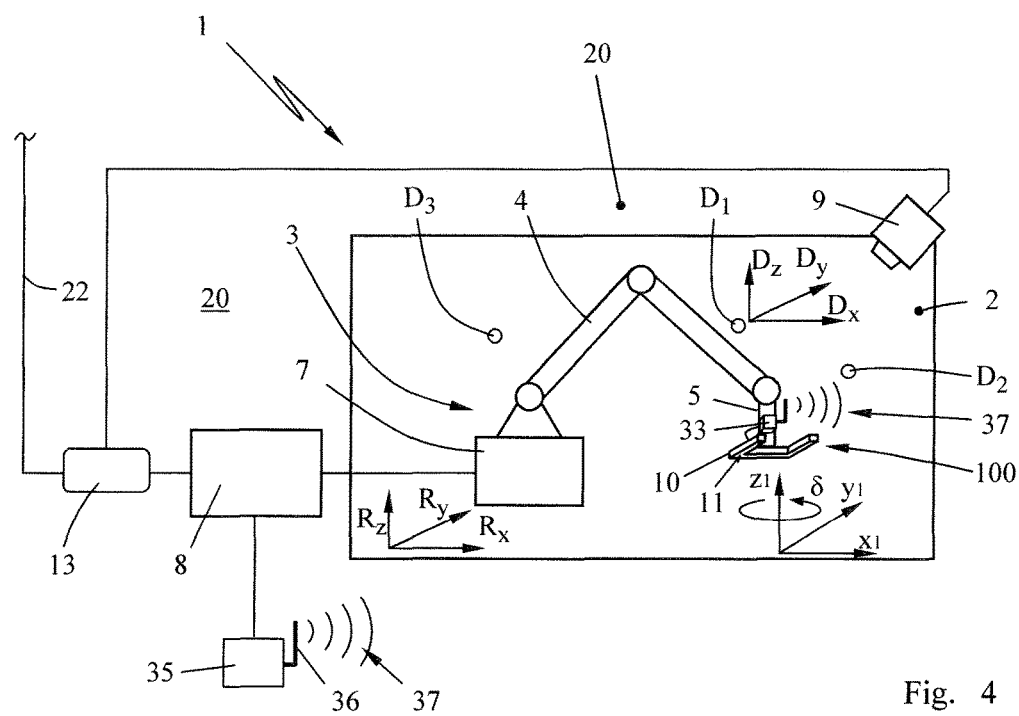

FIG. 4 shows an embodiment of the device according to FIGS. 1 to 3, which can be usable as an alternative or can be combined with the embodiments according to FIGS. 1 to 3. The configuration of the device corresponds to that in accordance with FIG. 2, which is why the same reference signs are used for the same parts.

In order to dispense with cable leadthroughs for the signal cable of the calibration system 100 or of the position sensor 10 within the robot cell 2, provision is made in the embodiment according to FIG. 4 of providing the calibration system 100 or the position sensor 10 with a transmission/reception unit 33 for setting up the robot 3 so as to transmit the data from the calibration system 100, the data from the position sensor 10 in the embodiment, wirelessly to the computer unit or to the control unit 8. To this end, the control unit 8 is connected to a base unit 35 arranged outside of the robot cell 2, which base unit establishes the wireless data connection 37 to the transmission and reception unit 33 within the robot cell 2. The wireless communication between the transmission/reception unit 33 and the base unit 35 is advantageously embodied as a radio link, for example, as a WLAN or Bluetooth™ radio link.

In the embodiment of the device, provision can be made for fixing the calibration system 100 onto the robot arm 4 such that the position sensor 10 is moved together with the robot arm 4. Advantageously, the calibration system 100 or the position sensor 10 of the calibration system 100 is fastened to the tool tip 5 (TCP) of the robot arm 4 or assembled at the gripper system of the robot arm 4. In order to embody the calibration system 100 or the position sensor 10 as an independent component, which operates autonomously, the transmission and reception unit 33 can be arranged in the housing of the calibration system 100 or the position sensor 10 together with an energy store such as a rechargeable accumulator for supplying the components with voltage. For the purposes of setting up the robot 3, a technician merely needs to assemble the autonomous calibration system 100 on the robot arm 4 and switch it on; the autonomous calibration system 100 establishes a wireless data connection 37 to the base unit 35 and can be used in a remote controlled manner by a robotics specialist for setting up and calibrating the robot 3. After the setup is complete, the autonomous calibration system 100 is disassembled again by the technician and removed from the robot cell such that it is neither able to form a constraining contour during operation nor exposed to the burdensome ambient conditions during operation.

Particularly in the case of industrial cleaning installations, in which the robot 3 stands in the wet region of the robot cell 2, the provided radio link between the position sensor 10 of the calibration system 100 and the control unit 8 or a controller is advantageous. The voltage supply for the calibration system 100 or the position sensor 10 and the transmission/reception unit 33 situated in the robot cell 2 is ensured by the accumulator integrated into the calibration system 100. Expediently, the transmission/reception unit 33 and the accumulator can be integrated into the housing of the position sensor 10. As a result, the assembly of two devices on the robot gripper is dispensed with. In order to ensure a reliable, interference-free radio link and in order to avoid possible radio communication problems as a result of metal walls of the robot cell 2, the antenna 36 of the base unit 35 can be laid into the robot cell 2 by way of an extension lead for the purposes of the setup routine.

The data transmission by way of a radio link realizes the following advantages:

- Automated and non-automated calibrations of both the robot and the user coordinate systems are possible, without a cable connection between the control unit 8 and the position sensor 10 colliding with, and being damaged by, possible constraining contours within the robot cell 2.
- A simple use in wet cells is possible.
- The position sensor 10 and the transmission/reception unit 33 including an accumulator can be assembled both on the robot 3, in order to measure external TCPs (tool center points), and within the robot cell, in order to measure TCPs at the robot hand flange.
- The position sensor 10 becomes mobile and it can be used without much outlay for a plurality of robot cells 2.
- The system is independent of field bus type and robot type.

It is understood that the foregoing description is that of the preferred embodiments of the invention and that various changes and modifications may be made thereto without departing from the spirit and scope of the invention as defined in the appended claims.

What is claimed is:

1. A method for at least one of setting up and calibrating a robot positioned in a work environment at an operation site, wherein a predetermined routine is processed for at least one of the purposes of setting up and calibration, the method comprising the steps of:
generating the routine for the robot via a data processing installation spatially distant from the site of operation;
after completing the generation of the routine, transmitting the routine via said data processing installation to a control unit of the robot at the operation site;
calling up the routine at the operation site and remotely executing the routine at the operation site via said data processing installation at a control center located remotely from the operation site; and,
after the start of the generated routine, allowing the generated routine to automatically process without intervention by an operator at the operation site.

2. The method of claim 1, comprising the further steps of:
first virtually executing setting up and/or calibrating the robot via said data processing installation utilizing the generated routine; and,
only after successfully completing the virtual setting up, transmitting the routine to the control unit of the robot via said data processing installation at the operation site.

3. The method of claim 1, wherein the routine is generated offline at the data processing installation without a data connection to the robot.

4. The method of claim 1, wherein the control center communicates with the operation site via at least one of a wireless and a wired data connection.

5. The method of claim 4, wherein movements to be executed by the robot are monitored via an image transmission from the operation site to the control center.

6. The method of claim 1, wherein an online data connection is present between the control center and the operation site during running time of the routine at the operation site.

7. The method of claim 6, wherein the data connection is operated as a VPN-tunnel.

8. The method of claim 1, wherein the robot has a base and a worktool having worktool tips and a position sensor is fixedly mounted with given coordinates ($G_x$, $G_y$, $G_z$) relative to the base of the robot and is configured to detect position coordinates (x, y, z) of the worktool tips; and, wherein the method comprises the further steps of:
executing setting up movements of the worktool tips relative to the position sensor within the routine;
detecting at least one of the position coordinates (x, y, z) of the robot worktool tips detected by the position sensor and a rotation ($\delta$) of the robot worktool tips; and,
evaluating within the routine at least one of the position coordinates (x, y, z) and the rotation ($\delta$) and transferring into a coordinate system ($R_x$, $R_y$, $R_z$) of the base of the robot at the operation site.

9. The method of claim 8, wherein the detection of the position coordinates (x, y, z) of the robot worktool tips in the position sensor is processed within a subroutine of the generated routine.

10. The method of claim 1, wherein a position sensor is fixedly mounted on robot worktool tips; and, the method comprises the further steps of:
within the routine, moving to at least one reference point ($D_1$, $D_2$, $D_3$) lying at pregiven coordinates ($D_x$, $D_y$, $D_z$) with the position sensor in the work region of the robot;
detecting at least one of position coordinates (x, y, z) of the reference point ($D_1$, $D_2$, $D_3$) detected by the position sensor and a rotation ($\delta$) of the reference point ($D_1$, $D_2$, $D_3$); and,
within the routine, evaluating the position coordinates (x, y, z) and/or the rotation ($\delta$) and transferring into a coordinate system ($R_x$, $R_y$, $R_z$) of the robot base at the operation site.

11. The method of claim 9, wherein the detection of the position coordinate (x, y, z) of a reference point ($D_1$, $D_2$, $D_3$) is processed within a subroutine of the generated routine.

12. The method of claim 1, wherein the robot is taken into operation from a remote location after completion of the generated routine.

13. The method of claim 1, wherein the robot is taken into operation via the data processing installation.

14. The method of claim 1, wherein the data processing installation is provided with the routine at a simulation location.

15. The method of claim 1, wherein the robot has a robot arm with a worktool having a worktool tip; and, a test mandrel is mounted on the worktool tip.

16. The method of claim 8, wherein the position sensor is configured as a fork sensor.

17. The method of claim 16, wherein, within the routine for setting up and/or calibrating the robot, a subroutine is called up which carries out and monitors the setup movements of the robot tool tip with a test mandrel while using the fork sensor.

* * * * *